United States Patent
Tiernan (12) 
(10) Patent No.: US 6,875,015 B1
(45) Date of Patent: Apr. 5, 2005

(54) CEMENT PRODUCING SYSTEM INCORPORATING A WASTE DERIVED FUEL SUSPENSION BURNER FOR A DOWN DRAFT CALCINER

(76) Inventor: John Tiernan, 6175 Clemantis Dr., Dayton, OH (US) 45449-3005

( * ) Notice: Subject to any disclaimer, the term of this patent is extended or adjusted under 35 U.S.C. 154(b) by 0 days.

(21) Appl. No.: 10/811,463

(22) Filed: Mar. 27, 2004

(51) Int. Cl.$^7$ ................................................ F27B 15/08
(52) U.S. Cl. ........................ 432/106; 432/58; 110/346
(58) Field of Search ........................... 432/14, 58, 106; 110/245, 346; 106/700

(56) References Cited

U.S. PATENT DOCUMENTS

| | | | |
|---|---|---|---|
| 4,464,111 A | 8/1984 | Rastogi et al. | |
| 5,816,795 A | 10/1998 | Hansen et al. | |
| 5,989,017 A | * 11/1999 | Evans | 432/14 |
| 6,470,812 B1 | 10/2002 | Arroyave-Garcia et al. | |
| 6,773,259 B1 | * 8/2004 | Bech et al. | 432/14 |

* cited by examiner

Primary Examiner—Gregory Wilson
(74) Attorney, Agent, or Firm—R. William Graham (57) ABSTRACT

A cement producing system includes a rotary kiln, a riser duct having lower portion communicably connected to the rotary kiln to pass process materials thereto, and a down draft calciner having a lower portion communicably connected to the lower portion of the riser duct. A tertiary duct is communicably connected to an upper portion of the down draft calciner to receive heated tertiary gas therefrom and a suspension burner is operably disposed in the down draft calciner in a manner to permit receipt of combustible waste and suspension of the waste therein for combustion thereof. A method of producing cement using the burner in the down draft calciner is also provided.

11 Claims, 8 Drawing Sheets

CEMENT PRODUCING SYSTEM INCORPORATING A WASTE DERIVED FUEL SUSPENSION BURNER FOR A DOWN DRAFT CALCINER

BACKGROUND OF INVENTION

Field of Invention

This invention relates to improvements in calciner and precalciner technology. More particularly, the invention relates to a system for use in burning waste materials in a down draft calciner for providing alternative energy. This invention allows an efficient use of the heating power of waste materials, preferably solids such as vehicle tires, and also other waste materials in bulk or crushed form to reduce fuel consumption expenses in large capacity industrial furnaces, particularly of the rotary kiln type, used in the cement or similar industries.

Currently, such alternative waste derived fuels have been operably disposed within a riser duct of a kiln. The use of such waste products is a function of the burning environment, for example, the amount of heat required and oxygen content within the kiln. In the cement industry, rotary furnaces require large amounts of fuel, particularly of the liquid and gas types to achieve the high temperatures needed in the range of 900 degree C. and above, for example. These temperatures are capable of burning or incinerating all sorts of materials that may be fed to such furnaces.

Rotary furnaces are highly effective and efficient devices for elimination of waste, particularly environmentally hazardous, and through full and absolute combustion, due to the high temperatures they reach. They are capable of disintegrating hazardous waste into their more basic components, such as carbon dioxide, nitrogen gases, etc. Also combustion residues as well as non-combusted non-hazardous components, such as metals, from many waste materials can be safely incorporated in the cement clinker product as an environmentally safe use. These other components may also be needed in part to provide a desired product.

Direct deposit of waste derived fuel into the kiln can have critical effects in the product forming process. Consequently, the use of such waste derived fuels in such calcining processes is carefully monitored.

Attempts have been made in industrialized countries, since the end of the past century, to reduce fuel costs for the cement industry in general and for rotary furnaces in particular, to try to optimize the combustion conditions of such fuels, and in place of traditional fuels to substitute organic fuel material having a very low cost. Among the latter, tires have been found to be highly suitable.

Suffice to say, there is an ongoing effort to use waste materials in such systems to reduce cost of operation. One such system uses a conventional cement kiln plant with a rotary kiln for producing cement clinker having a downstream cooler and an upstream calciner and preheater (the preheater being a typical cascade of cyclone separators). A tertiary air duct carries hot air from the clinker cooler to the intake to the calciner. Added to this conventional structure is a separate decomposition chamber for converting waste material into combustible gas by means of heat derived from injection of a portion of the preheated and calcined cement raw meal particles into the decomposition chamber.

Such system uses exhaust gases from the rotary kiln for the decomposition of waste where it is difficult for the kiln gases to move up through the decomposition chamber in a controlled flow due to the high temperature. The use of such kiln gases for decomposition of the waste materials can have a disturbing effect on the draft conditions of the kiln system.

Other systems use exhaust gas from the rotary kiln in the upstream decomposition of the waste material. Systems also use burners disposed in a riser duct to combust the waste material and use a fan to draw in tertiary air from the tertiary air duct and mix in a with rising gas from the kiln wherein a resulting gas mixture is used to decompose the waste materials.

There remains a need to improve calciner and precalciner technology in spite of the attempts by industry to make use of waste material combustion in rotary furnaces, there remains a need for a highly efficient, easily operated, low cost, system that will better achieve the mentioned goals.

OBJECTIVES OF THIS INVENTION

An object of the invention is to improve calciner and precalciner technology.

Another object is to improve stability of combustion in rotary furnaces of the type used in the cement industry.

Yet another object is to improve the quality of product made in a rotary kiln.

Another object is to improve the efficiency of making the product made in a rotary kiln.

Still one more objective of this invention is to enhance the process in which waste material is burned within a rotary kiln.

Accordingly, the invention is directed to a cement producing system incorporating a waste derived fuel suspension burner for a down draft calciner. The system has a rotary kiln, a riser duct having an upper portion and a lower portion, wherein the lower portion is communicably connected to the rotary kiln to receive process materials therethrough and to pass the same to the rotary kiln. A down draft calciner is communicably connected to the lower portion of the riser duct and equipped to receive heated tertiary gas. The down draft calciner includes a suspension burner operably disposed therein to receive combustible waste, wherein the waste is combusted by the tertiary gas and the resultant gas is passed through to the riser duct. In addition, the burner provides for waste residual to pass through to the lower portion of the riser duct and on to the kiln.

The suspension burner includes a plurality of support fingers each having a waste derived fuel support surface which are removably disposed in the down draft calciner to provide for self cleaning of the support surface of the fingers upon removal from the calciner. Preferably, the suspension burner includes means for automatically retracting the fingers from the calciner. Further, means for automatically feeding the waste material on to the fingers of the suspension burner are provided.

The present invention is particularly useful in cement rotary furnaces and using a novel a structure and method and provides an automated feed of waste materials, preferably tires, into the down draft calciner. Upon burning tires, residual metals from within the tires pass by virtue of their weight and gravity to the kiln where the metals intermix with other concrete process materials, i.e., steel wires from tires provide an iron supplement required for forming suitable cement clinker. The decomposition/combustion gases pass through to the riser duct with the aid of a draft fan positioned in the system to draw air/gas up and through the riser duct.

With the use of the invention, it is contemplated that the alternative waste energy including at least partially combustible organic-containing waste can provide a substantial amount of the heat required for running the cement kiln. Novelty of the invention will be apparent hereinafter as discussed more fully below and other objectives and advantages of this invention will be apparent from reading the drawings and description hereinafter.

DETAILED DESCRIPTION OF THE PREFERRED EMBODIMENTS

Referring now to the drawings, a cement producing system incorporating a waste derived fuel suspension burner for a down draft calciner is generally referred to by the numeral 10. The alternative fuel, which can preferably be combustible waste tires 12, is fed to a down draft calciner 14 via a suspension burner 16. The system 10 has a rotary kiln 18 and riser duct 20 having an upper portion 22 and a lower portion 24, wherein the lower portion 24 is communicably connected to the rotary kiln 18 to receive process materials 26 therethrough and to pass the same to the rotary kiln 18 via a gravity feed. The process material feed chute 62 is connected to the lower portion 24 of the riser duct 20. The upper portion 22 can be connected to one or more preheater in the form of a cascade of cyclone separators upstream of the riser duct 20.

The down draft calciner 14 has an upper portion 28 and a lower portion 30, wherein the lower portion 30 is communicably connected to the lower portion 24 of the riser duct 20. A tertiary gas duct 32 is communicably connected to the upper portion 28 of the down draft calciner 14 to pass heated tertiary gas thereto. Operably disposed between the upper portion 28 and the bottom of the lower portion 30 in the down draft calciner is suspension burner 16 to receive combustible waste tires 12, wherein the waste tire 12 is combusted by the tertiary gas and the resultant gas is passed through to the riser duct 20. In addition, the burner 16 provides for waste residual 13 to pass through to the lower portion 24 of riser duct 20 and on to the kiln 18. The lower portion 24 has a graded angle to provide for the falling material to be suitably fed to the entrance of rotary kiln 18. The rotary kiln 18 is also slightly pitched as is known in the art of cement processing.

The suspension burner 16 includes an exterior gate 63 and an interior gate 64 which provide an airlock during waste derived fuel material injection into the down draft calciner 14. The exterior gate is opened while the interior gate is closed to pass waste derived fuel material into the burner housing 31. The exterior gate 63 is closed while the interior gate 64 is opened to pass waste derived fuel material 12 from the burner housing 31 into the down draft calciner 14.

Further, the suspension burner includes a plurality of support fingers 17 each having a waste support surface 19 which are removably disposed in the down draft calciner 14 to provide for self cleaning of the support surface 19 of the fingers 17 upon removal from the calciner 14. Preferably, the suspension burner 16 includes means 21 for automatically retracting the fingers 17 from the calciner 14. The means 21 can include a motor and a linear actuator which are operably connected to the fingers 17.

Further, the burner 16 includes means 23 for automatically feeding the tires 12 on to the fingers 17 of the suspension burner 16. In this regard, the means 23 can include an inclined elevator belt 34 wherein the tires 12 are placed and elevated thereby to an unloading station 36. The tires 12 are loaded onto a belt conveyor 38 which feeds the tires 12 to the suspension burner 16 through an opening thereof. A truck ramp 40 is operably disposed adjacent a trailer tipper 42 for enabling dumping tires 12 into a hopper 44. A rotating disk tire separator 46 is operably connected to the hopper 44 and separates tires 12 into an accumulator 48 for inspection. Unsuitable tires 12' are rejected onto a reject conveyor belt 50, while accepted tires 12 are fed onto the inclined conveyor belt 34.

Such feed is controlled by means of a controller 25 which is operably connected to a sensor 27 located in the down stream gas flow of the down draft calciner 14 to sense when the conditions are suitable for combustion to take place for the next in line tire 12. A linear actuated ram 29 is controllably moved back and forth through burner housing 31 where upon the controller 25 receiving proper sensed conditions, enables the ram 29 to push the waste derived fuel material 12 from the burner housing 31 into the down draft calciner 14 and onto the suspension fingers 17. The tire 12 is burned by the tertiary gas emanating from the tertiary air duct 32 into the down draft calciner 14. Tires 12 may also be introduced mechanically into burner 16 by other means such as a screw feed or other similar device (not shown). FIGS. 3A–3D show these steps of the process.

It is thought that combustion which takes place in the down draft calciner 14 in this manner is more efficient and effective than other methods which are in the riser duct 20. In addition, residual waste 13 is gravity fed to the kiln 18.

Figure 1:
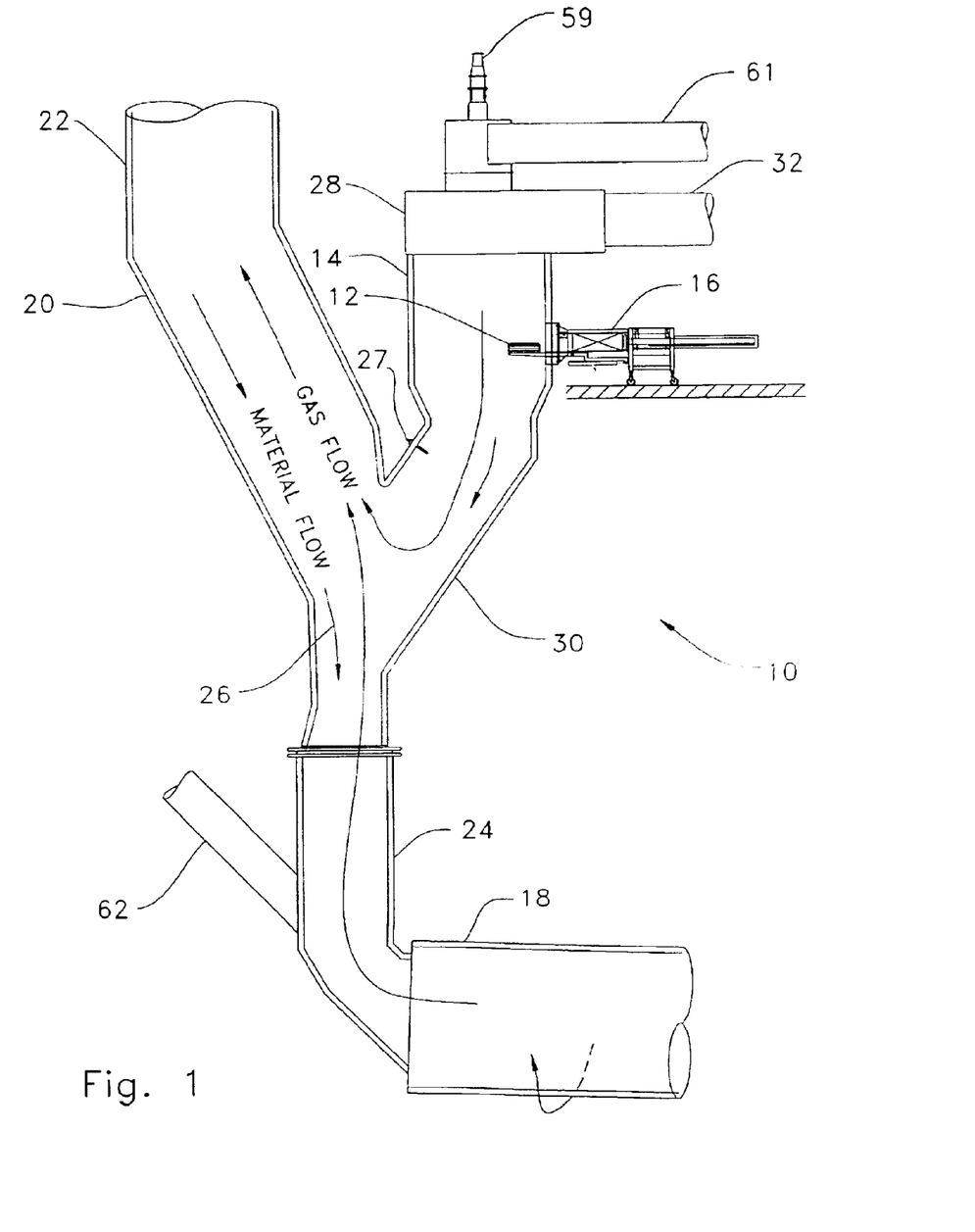
FIG. 1 is a partially sectioned side elevation diagrammatic view that shows a portion of a cement manufacturing plant embodying the invention, especially the down draft calciner with suspension burner.
Figure 2:
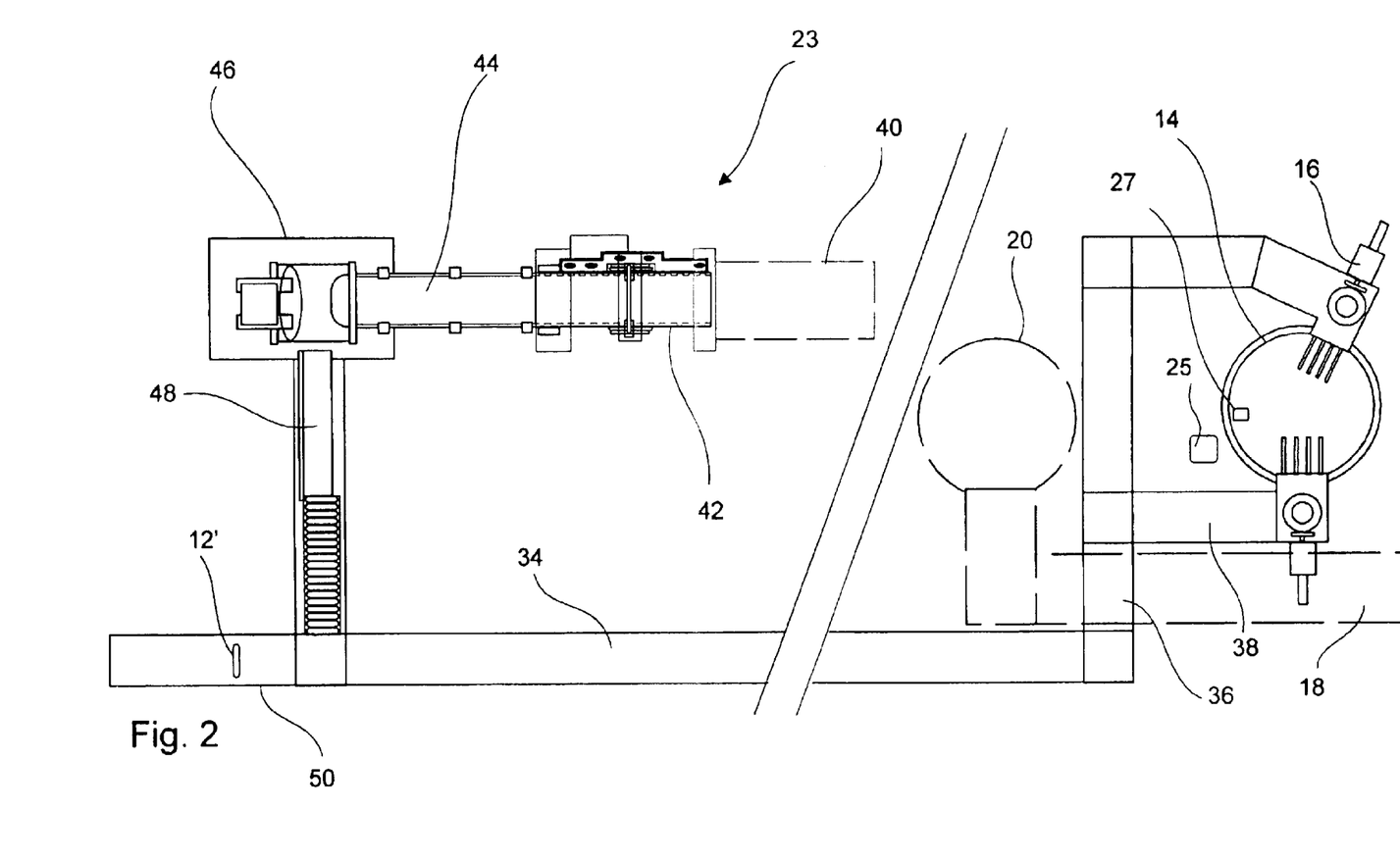
FIG. 2 is a partially schematic view that shows a portion of a cement manufacturing plant embodying the invention.
Figure 3A:
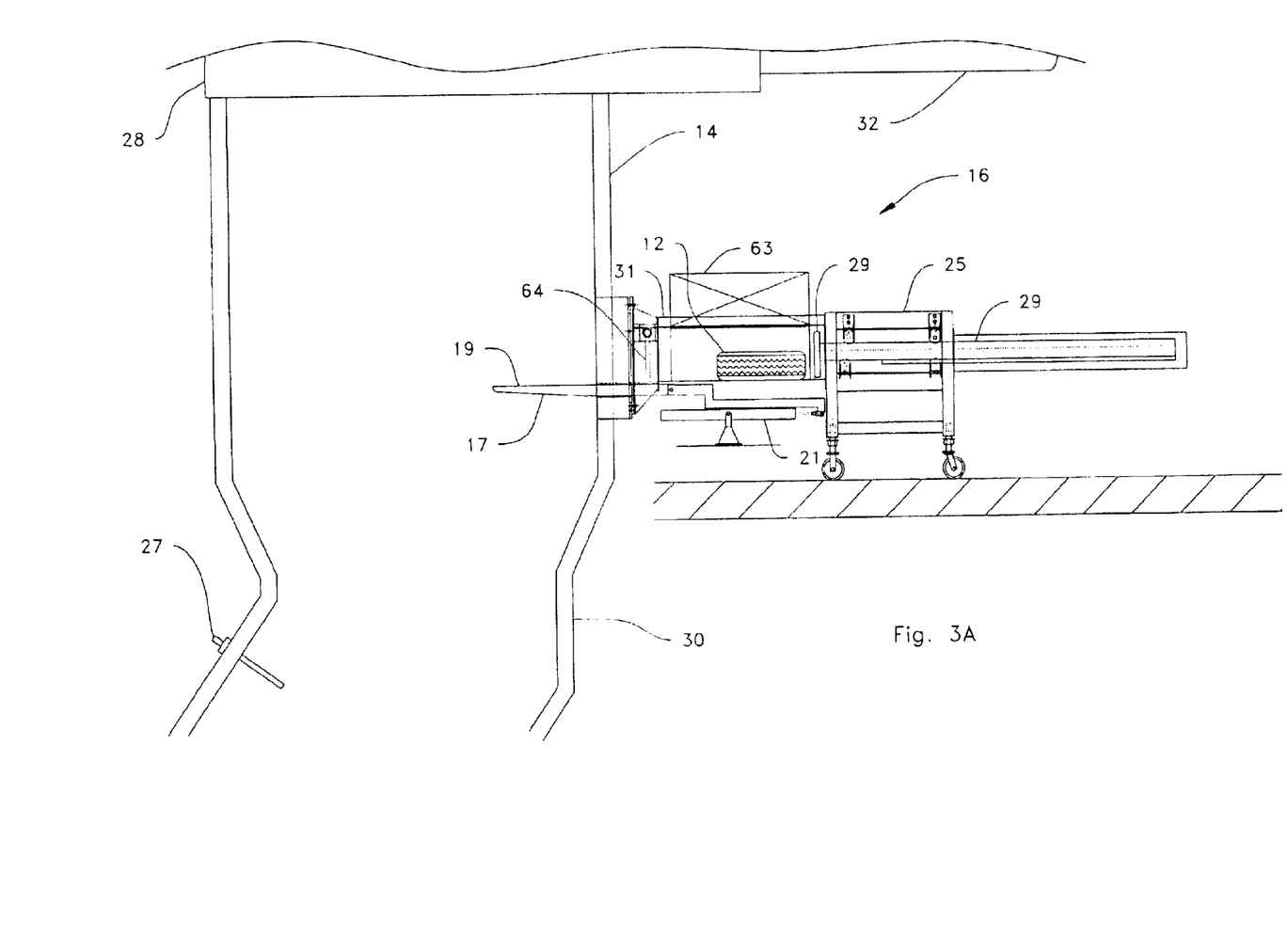
FIG. 3A is a view illustrating a first mode of the burner of the instant invention.
Figure 3B:
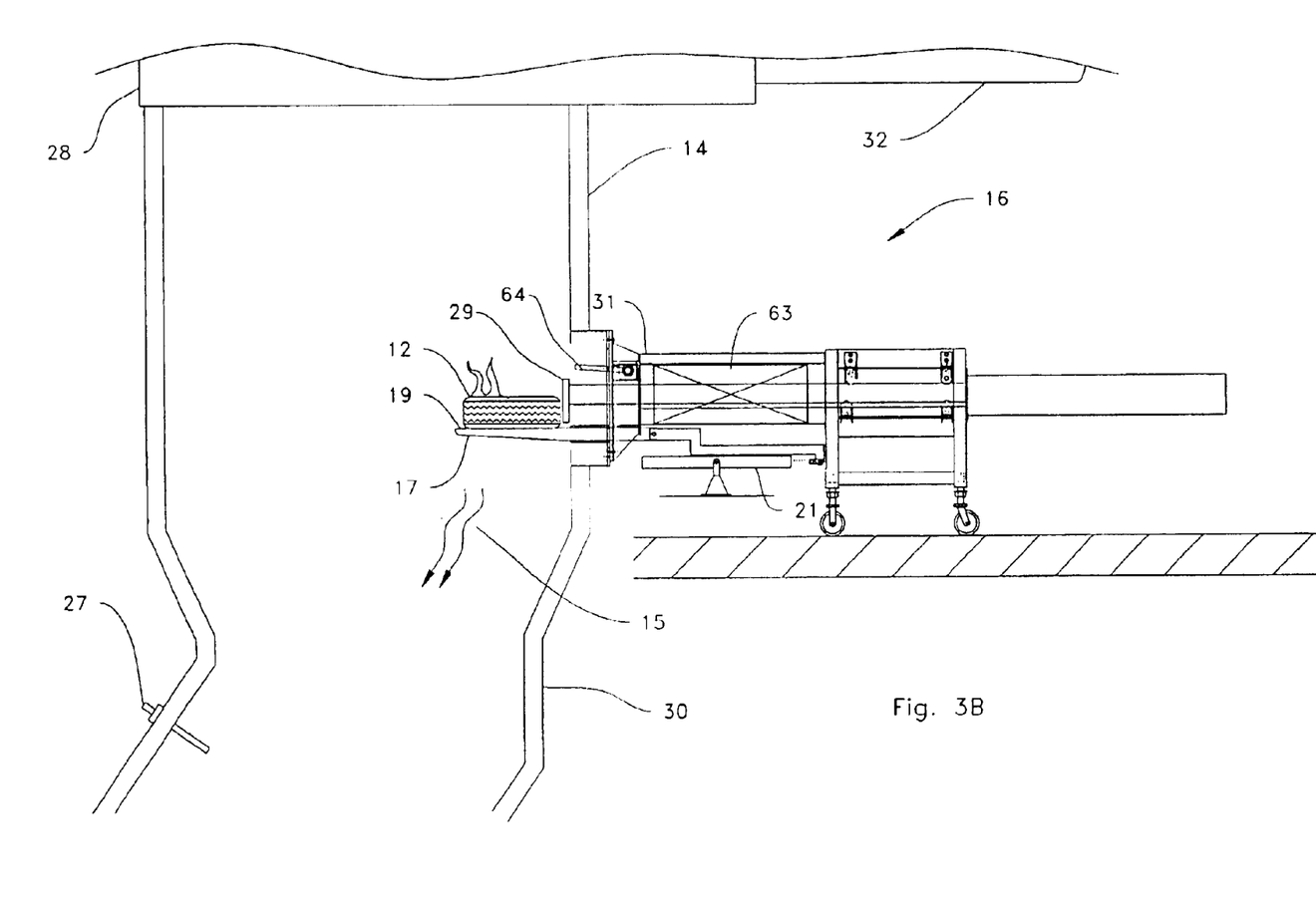
FIG. 3B is a view illustrating a second mode of the burner of the instant invention.
Figure 3C:
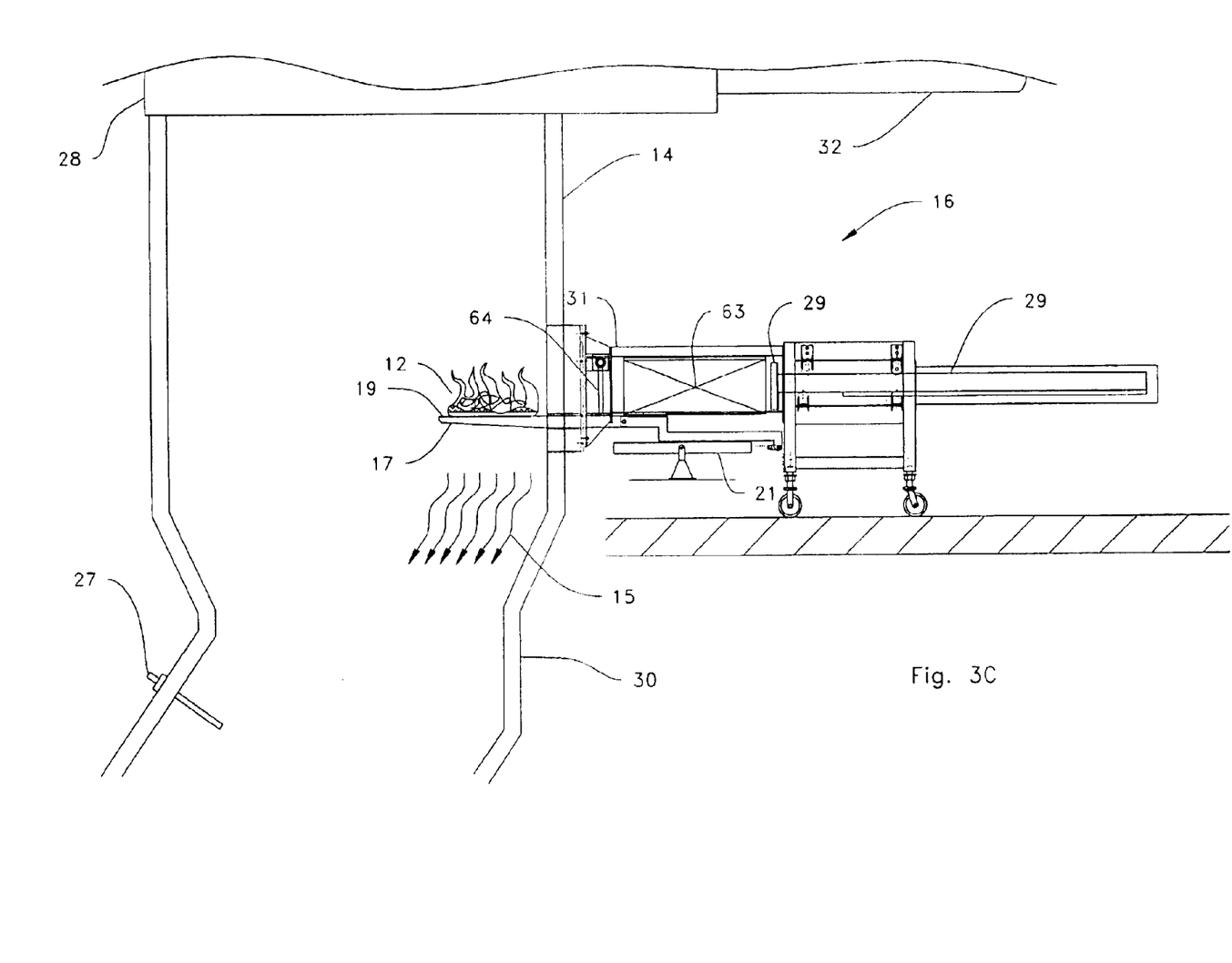
FIG. 3C is a view illustrating a third mode of the burner of the instant invention.
Figure 3D:
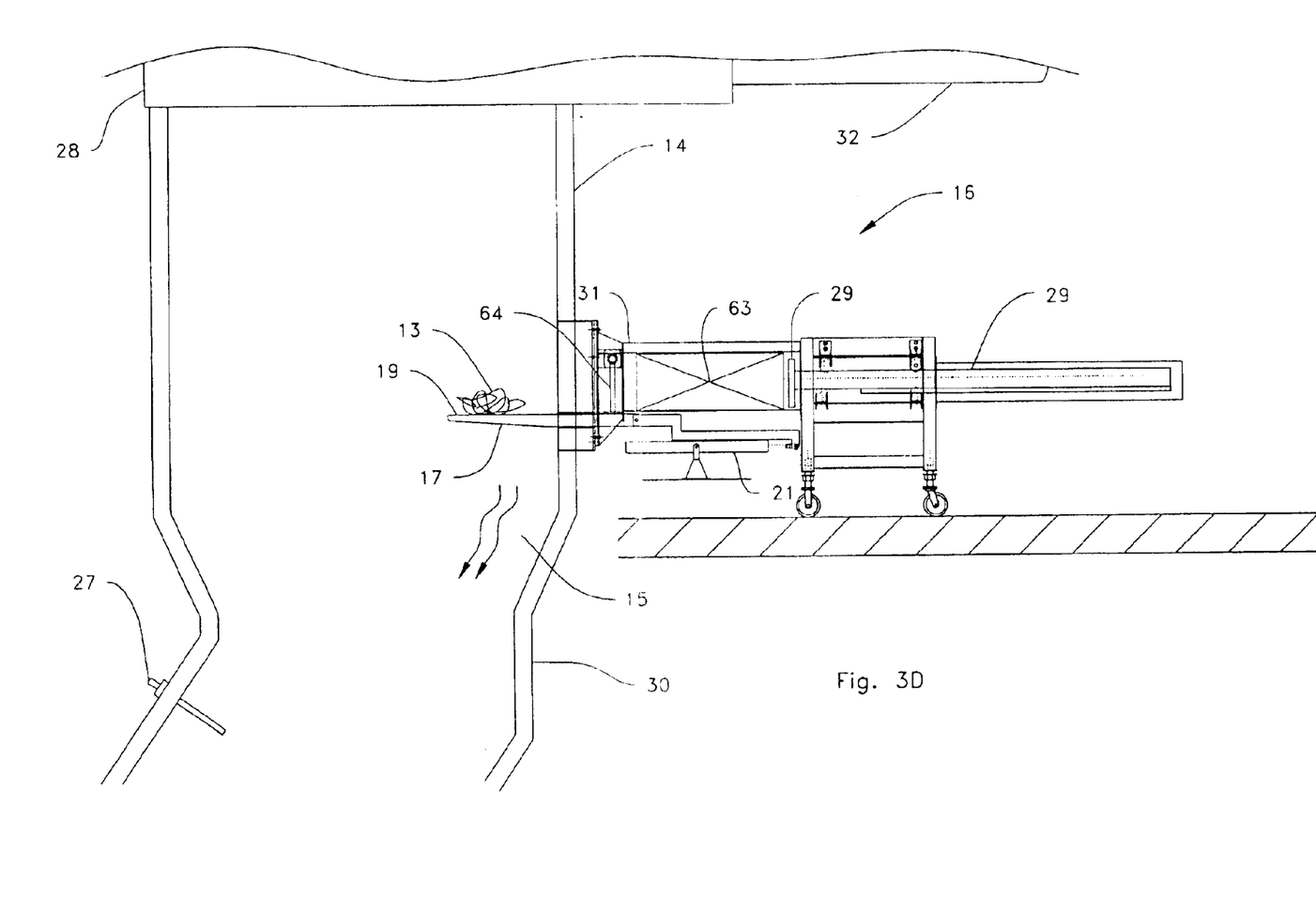
FIG. 3D is a view illustrating a fourth mode of the burner of the instant invention.
Figure 3E:
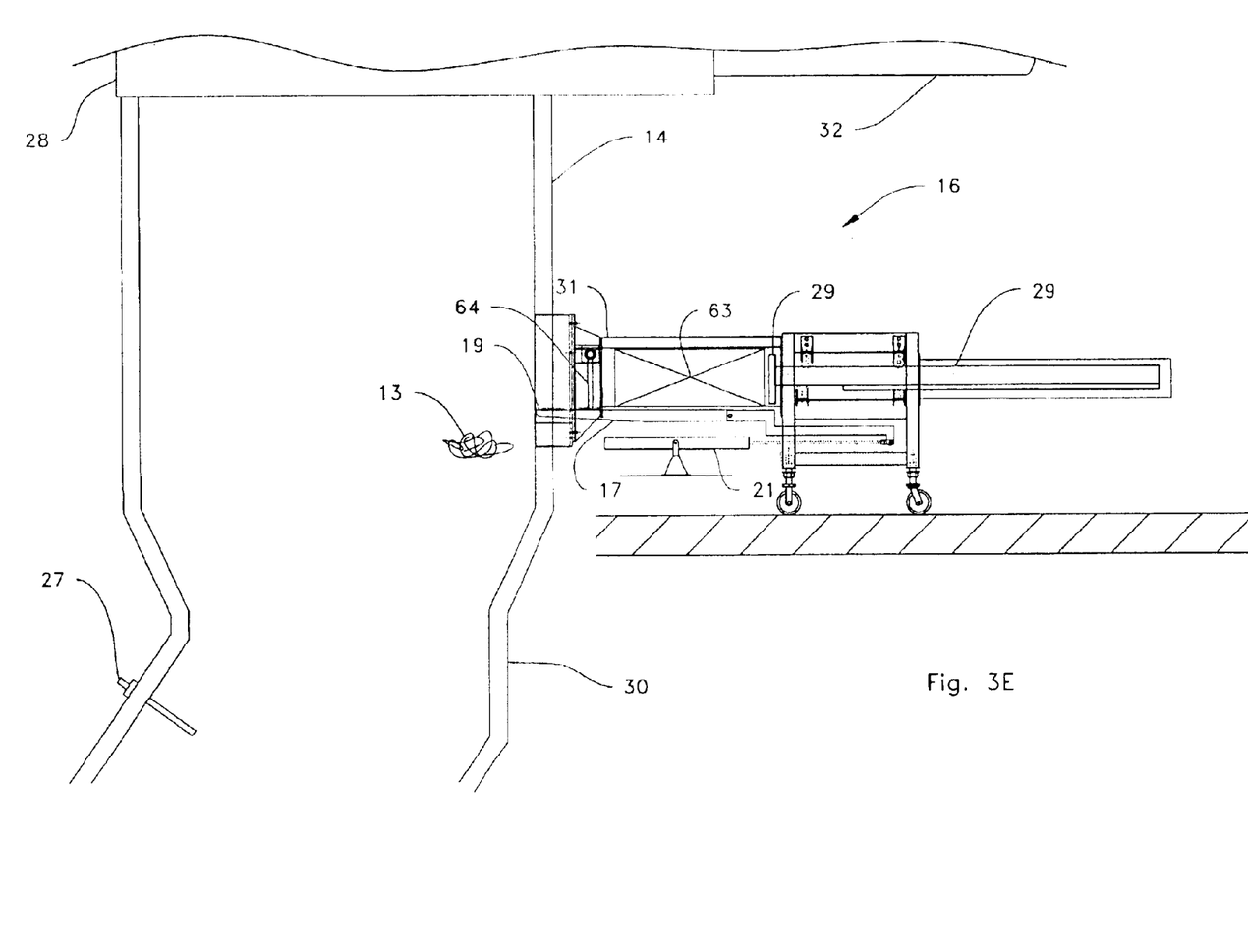
FIG. 3E is a view illustrating a fifth mode of the burner of the instant invention.
Figure 4:
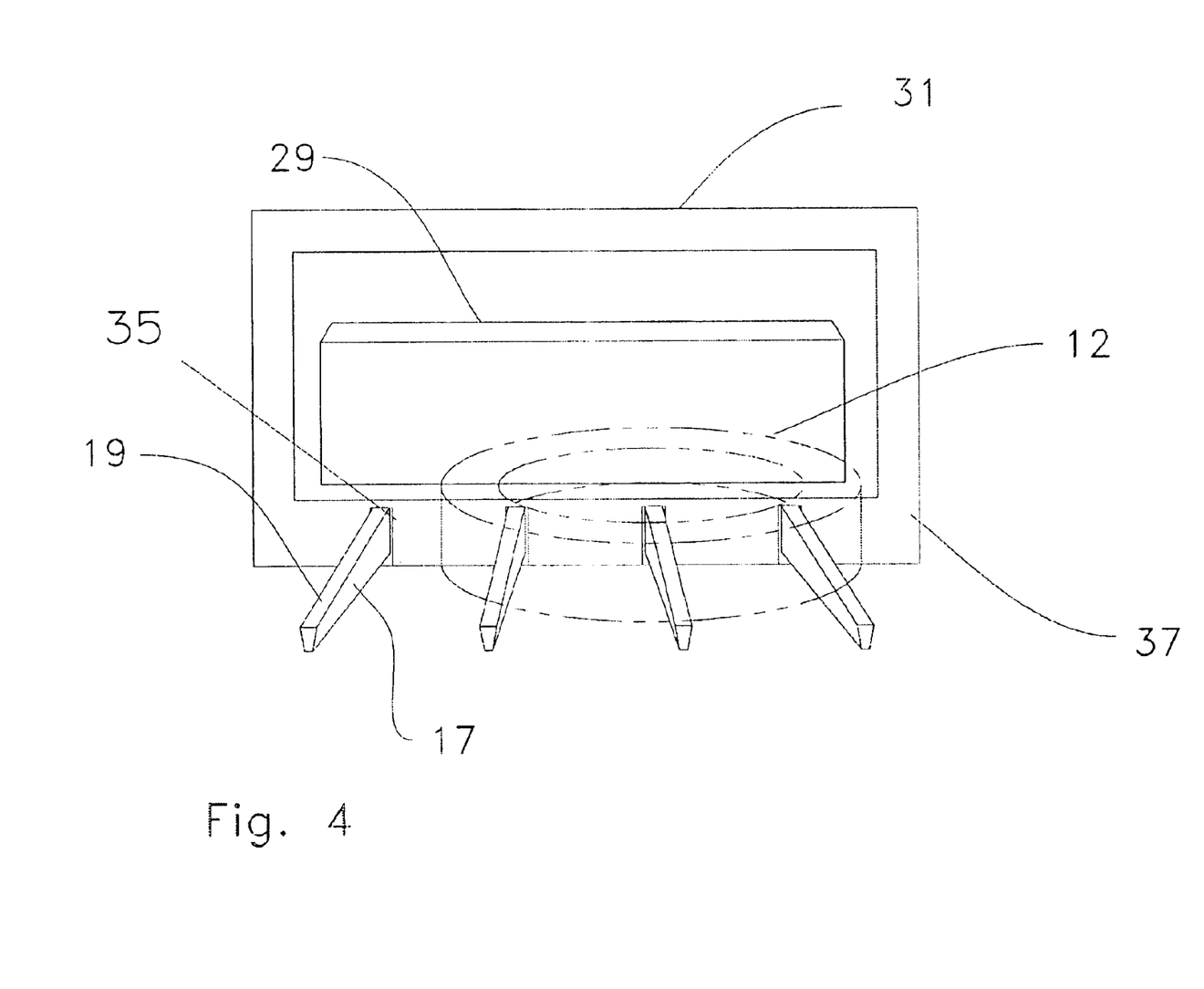
FIG. 4 is a perspective view of the burner of the instant invention.

The incomplete combustion products (solid waste derived fuel residues) 13, their combustion gases 15, and the combustion products 12 themselves are shown in the down draft calciner 14 in which they are subjected to a temperature and oxygen content suitable for combustion. Residual waste 13 are removed from the support surface 19 and passed through the lower portion 24 of the riser duct 20 and fall into the rotary kiln 18. In this regard, slotted surfaces 35 can be formed in a mounting face 37 (see FIG. 3E) through which the fingers 17 move back and forth to effect the removal of the residual waste 13.

Calciner fuel burner 59 for the down draft calciner 14 is operably disposed in the top of down draft calciner 14 which burns conventional fuels. A tertiary duct portion 61 is provided to deliver tertiary gas to the burner 59 to facilitate combustion. The system includes air blowers of the type known to draw air through the riser duct 20.

The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A cement producing system, comprising:

a rotary kiln;

a riser duct having an upper portion and a lower portion, wherein said lower portion is communicably connected to said rotary kiln to pass process materials therethrough and to said rotary kiln;

a down draft calciner having an upper portion and a lower portion, wherein said lower portion is communicably connected to said lower portion of said riser duct;

a tertiary duct communicably connected to said upper portion of said down draft calciner and to receive tertiary gas therefrom;

a suspension burner operably disposed in said down draft calciner in a manner to permit receipt of combustible waste fuel and suspension of said waste in said down draft calciner, wherein said suspension burner includes a plurality of support fingers each said finger having a waste support surface, wherein said fingers are removably disposed in said down draft calciner in a manner to provide for self cleaning of said support surface upon removal from said down draft calciner.

2. The cement producing system of claim 1, wherein said lower portions are connected in a manner to permit residual noncombustible solid waste to pass to said rotary kiln by gravity.

3. The cement producing system of claim 1, wherein said suspension burner includes means for automatically retracting said fingers from said down draft calciner.

4. The cement producing system of claim 1, which further includes means for automatically feeding said combustible waste fuel onto said support surface of said fingers.

5. The cement producing system of claim 1, which further includes means for drawings resultant gas produced from combusting said waste fuel by said tertiary gas through to said riser duct.

6. The cement producing system of claim 1, further comprising at last one preheater in the form of a cascade of cyclone separators upstream of said riser duct.

7. A cement producing system comprising:

a rotary kiln;

a riser duct having an upper portion and a lower portion, wherein said lower portion is communicably connected to said rotary kiln to pass process materials therethrough and to said rotary kiln;

a down draft calciner having an upper portion and a lower portion, where said lower portion is communicably connected to said lower portion of said riser duct;

a tertiary duct communicably connected to said upper portion of said down draft calciner and to receive tertiary gas therefrom;

a suspension burner operably disposed in said down draft calciner in a manner to permit receipt of combustible waste fuel and suspension of said waste in said down draft calciner, and means for automatically feeding said combustible waste fuel onto said support surface wherein said feeding means includes an elevator to raise said waste fuel, an unloading station, a conveyor belt to receive the waste fuel from the unloading station and deliver into said suspension burner, and a control sensor operably connected to said conveyor belt for sensing when conditions in said down draft calciner are suitable for feeding said waste fuel and controlling said conveyor belt feed rate in accordance with said sensed conditions.

8. A method of producing cement, comprising:

(a) delivering waste fuel to a suspension burner operably disposed in a down draft calciner in a manner to permit receipt of combustible waste fuel and suspension of said waste fuel in said down draft calciner;

(b) introducing a tertiary gas into an upper portion of said down draft calciner in a manner to cause combustion of said waste fuel; and (c) passing said combusted waste fuel into a riser duct which is communicably connected to a rotary kiln in a manner to pass process materials and combusted materials to said rotary kiln wherein said suspension burner includes a plurality of retractable support fingers and further includes the step of removing at least one of said fingers through a slotted surface in a mounting face connected to said calciner such that removal thereof results in cleaning residual waste from said finger.

9. A method according to claim 8, wherein said waste fuel includes tires.

10. A method according to claim 8, which further includes sensing combustion conditions in said calciner and delivering said waste fuel to said suspension burner upon sensing a predetermined combustion condition.

11. A method according to claim 8, wherein said the step of removing finger is performed automatically.

* * * * *